Jan. 21, 1964  E. J. DOWNING  3,118,781
LAMINATE AND METHOD OF MAKING
Filed Aug. 15, 1960
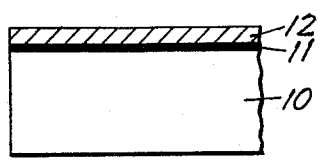
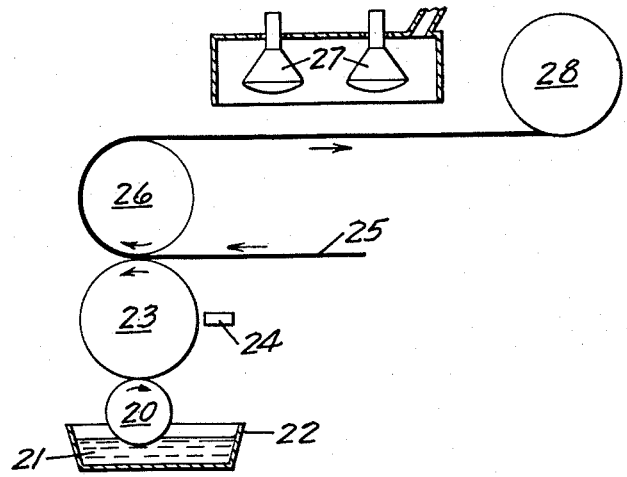
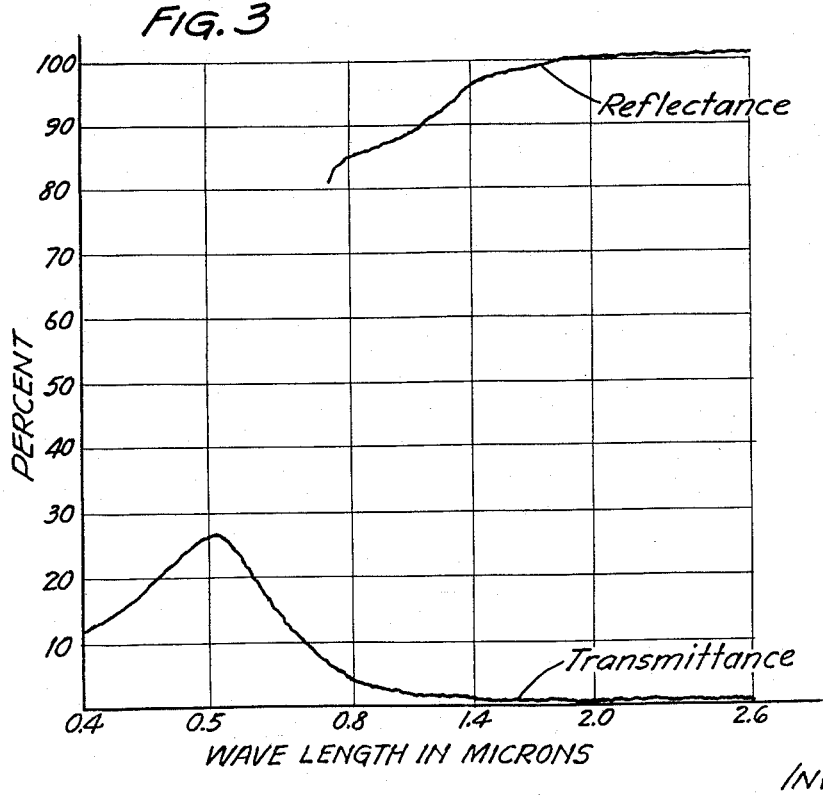
INVENTOR
EDWARD J. DOWNING
BY
Carpenter, Abbott, Coulter & Kinney
ATTORNEYS United States Patent Office 3,118,781
Patented Jan. 21, 1964

3,118,781
LAMINATE AND METHOD OF MAKING
Edward J. Downing, St. Paul, Minn., assignor to Minnesota Mining and Manufacturing Company, St. Paul, Minn., a corporation of Delaware
Filed Aug. 15, 1960, Ser. No. 49,541
7 Claims. (Cl. 117—33.3)

This invention relates to a novel laminate and method for making the same, and more particularly to a visibly-transparent heat-reflective laminate.

The invention provides articles which are particularly useful as heat-reflective face shields. These shields permit a wearer to observe objects without suffering facial discomfort, even under intense external heat conditions. They are flexible and may be used as heat-reflecting light-transmitting flexible inserts over plexiglass windows or the like in headgear. With reflective fabric suits made using a fabric such as described in Keithly U.S. Patent No. 2,703,772, face shields of the instant invention are effective to protect individuals against intense heat and yet permit visual observation of surroundings.

Heretofore, heat-reflective face shields exhibiting suitable transmission of visible light have possessed little durability in practical use applications. Rigid heat-reflective face shields of the prior art are readily susceptible to breakage, particularly heat-shock breakage. Known flexible face shields having vapor-deposited aluminum reflecting layers degrade rather rapidly in use applications, as by oxidation, so as to be ineffective for their intended purpose. Gold substituted for aluminum in various known face shield constructions resists oxidation; but resulting constructions exhibit poor resistance to removal of the gold reflecting layer by abrasion, such as occasioned during handling in use and storage. Even protective topcoats of silicon monoxide or other inorganic deposits over gold do not obviate the problem of relatively easy removal of that metal layer by abrasion.

Face shields of the instant invention are flexible as desired, permitting convenient storage and manufacture thereof, as well as obviating problems associated with heat-fracture or breakage in practical use applications. They exhibit high resistance to abrasive removal of their metal reflecting layer, even when that layer is gold, as is preferred. Further, in the preferred embodiment of the invention, the metal reflecting layer of the laminate is highly resistant to deterioration such as caused by oxidation, which is a further improved feature of my flexible face shields over those flexible ones heretofore known.

A critical feature of the laminate hereof lies in its ultra thin organic resin or lacquer topcoat over its vapor-deposited infra-red-reflective metal layer. The mere coating of organic lacquers over reflective metal layers is, of course, well known. But coatings of the prior art have been greatly thicker than the maximum upper limit of thickness tolerable in the coating of the instant invention. The resin or lacquer film coating of the invention must not exceed a maximum thickness of about 0.15 micron (i.e., about 1500 angstrom units). Indeed, the maximum thickness for this topcoat on the structure of this invention is so minute that ordinary roll coating methods or brush coating techniques for applying lacquer or organic resin film coatings are impractical from a production standpoint for gaining the ultra thin character required.

The invention will be described by reference to a drawing, made a part hereof, wherein:

FIGURE 1 is a magnified edge view of a laminate hereof;

FIGURE 2 is a schematic diagram of coating apparatus, serving in the nature of a flow sheet; and FIGURE 3 is a chart illustrating transmittance and reflectance curves for a preferred face shield of the invention.

Referring to FIGURE 1, the essential elements of my laminate comprise a base sheet 10 substantially transparent to wave lengths of visible light, a vapor-deposited visibly-transparent infra-red-reflective metal coating 11 on the base sheet, and an ultra thin visibly-transparent continuous resin film coating 12 over the vapor-deposited metal film.

A particularly outstanding and light-transmissive flexible base sheet to employ for the structure is a film of polyethyleneterephthalate ("Mylar"), suitably in thicknesses ranging from about 2 mils up to about 10 mils, preferably about 7 mils. This material advantageously has a heat tolerance in excess of about 300° F. without distortion. It unfortunately is a material off of which thin coatings of vapor-deposited gold can easily be removed by mere brushing contact; but this problem is one that is overcome by practice of the instant invention. Instead of employing polyethylene terephthalate base sheets, I may employ base sheets of other substantially transparent and flexible substrate materials, e.g., cellulose acetate, polystyrene, etc. Even base sheets of low resistance to heat distortion are useful where the resistance of the end structure to warpage or distortion caused by absorbed heat is not a significant or major consideration in the particular use to which it is to be put, or where convection currents adjacent the laminate in use may be relied upon to rapidly remove built-up heat. Base sheets which themselves are laminates of two or more materials may be used. The external or back surface of the base sheet left exposed after application of the metal reflecting layer usually should be non-tacky for face shield use; but a tacky or adhesive back surface, even one formed by specially coating a normally tacky and pressure-sensitive adhesive thereover, may be desirable where the thin composite laminate hereof is to be secured to an underlying substrate, whether transparent or opaque. Preferably, transparent flexible tough organic base sheets are employed.

The most efficient infra-red-reflective metal coating for my laminate, as well as one which affords high transmission characteristics in the visible light range when applied at minimal thicknesses satisfactory for substantial infra-red reflection, is gold. Of course, in addition to gold, other metals (e.g., aluminum, copper, silver, etc.) may be useful as an infra-red-reflective metal layer of the structure of the invention, even though the results obtained are less effective where the structure is used as a face shield. The metal reflective layer is coated upon the base sheet by any suitable vapor deposition technique such as, for example, described in the aforementioned patent to Keithly No. 2,703,772, here incorporated by reference.

The vapor-deposited metal layer exhibits high infra-red reflectivity as part of the laminate, i.e., at least about 75% reflection, and preferably above 85% or even 95% of the original intensity of wave lengths at about 2 microns and longer, and at least about 60% reflection of those wave lengths of infra-red from about 0.8 micron up to about 2 microns (preferably above 85% reflection between about 0.8 micron and 2 microns). In addition, for face shield use, this vapor-deposited coating must be sufficiently transmissive to light rays in the visible range so that a wearer can view objects through it. In most applications, its light transmission characteristic must be such that at least a portion of the visible wave lengths between about 0.4 and about 0.7 micron are transmitted through the total laminate to the extent of at least about 5% of their original intensity. It is sufficient, at a minimum, that only visible wave lengths of a single color are so transmitted; even though most practical structures will allow transmission of at least 5% of the original intensity of a substantial portion (at least 50%) of visible wave lengths. In preferred laminates, at least 15% or possibly at least 20% of the original intensity of at least one visible wave length is so transmitted. Even about 35% or slightly greater transmission of a visible wave length incident upon the front face of the laminate is possible while still retaining high heat reflectivity for the composite. In referring to original intensity of any wave length herein, I refer to that original intensity as measured by a Beckman Spectrophotometer where the reflectance of wave lengths by magnesium oxide is the base reference for 100% intensity.

Thickness measurements for this metal layer are estimates inasmuch as the transparent substrate or base sheet on which the metal is vapor-deposited according to the invention need not itself be smooth. For example, the surface of polyethylene terephthalate suitable to use as the base sheet may have surface defects or variations which are in excess of the thickness of the vapor-deposited metal film coating thereon. However, metal films at least about 100 angstrom units thick and having the visual appearance of being continuous are generally needed to gain the results of the invention, with thicknesses up to approximately 2000 angstrom units or so being possible without destroying transmission. For most efficient light transmission with heat reflectivity, thickness between about 200–1000 angstrom units are preferred. These thicknesses for the vapor-deposited metal layer may, of course, be essentially impossible to measure in structures of the invention where base sheets having irregular surface characteristics are employed. The foregoing figures for thickness were arrived at by using an optical interferometer for measuring the thickness of a vapor-deposited metal coating applied upon a smooth surfaced substrate such as highly polished glass using conditions and time for vapor deposition identical to those employed for coating the flexible base sheet of my laminate. (Specifically, as is conventional in using an optical interferometer for thickness measurements, a section of the coating to be measured and a section of the uncoated glass are each specially coated with an equal thickness of a further identical reflective material so that the reflected wave interference caused by the difference between the levels of specially-coated reflective material permits a reading of thickness.) In manufacture, the most convenient means for satisfactorily estimating the thickness of vapor-deposited metal while it is being applied is by means of observing the light transmission through the composite of base sheet and metal coating (e.g., photocell determination of light transmission). For example, metal may be vapor-deposited on the base sheet until only approximately 20% of the original intensity of visible light at a selected wave length, e.g., 4500 or 5500 angstrom units, is transmitted through the coating. Thus, the more tedious interferometer method for measuring actual thickness may be avoided.

Over the vapor-deposited metal coating is then applied an ultra thin coating of a film-forming organic resin. Various resin lacquers are suitable to employ for this purpose. It is essential that they exhibit film-forming properties at the ultra thin coating weights employed. They should not be strong absorbers of infra-red at the thicknesses employed, and should resist discoloration upon exposure to infra-red. Under the conditions of use, when the structure of the invention is exposed to intense radiant heat energy, it is not known whether or not ultra thin topcoating films of thermoplastic character may become fluid; the empirical fact is that they serve as a protective coating and yet do not significantly interfere with heat reflectivity at the thicknesses employed. The topcoat should not exceed about 0.15 micron thickness (i.e., about 1500 angstrom units) and preferably does not exceed over about 0.1 micron (i.e., about 1000 angstrom units). It must be continuous but may be as thin as about 0.02 micron or even less. Here also, measurements of the thickness for this topcoat protective resin film are difficult or essentially impossible as a part of the laminate itself. Irregularities of the surface of flexible base sheets are not removed by the vapor-deposited metal coating; and if anything, the composite of base sheet and vapor-deposited metal tend to present further irregularities at the surface to which the resin film is applied, even when due caution is taken to select smooth-surfaced flexible base sheets and to effect uniform vapor-deposition of metal thereon. Calculation of the quantity of resin or varnish solids applied over the surface of the vapor-deposited layer is one method for estimating the thickness of the ultra thin coating; but it should be recognized that some small portion of applied resin will penetrate into minute or microscopic cracks or spaces between particles of the vapor-deposited metal layer. Thus estimates of thickness may be slightly in excess of actual thicknesses when using the techniques for estimating here discussed. A useful technique for estimating the thickness of the applied resin is by way of applying a coating of resin on a smooth glass surface in quantity (and, of course, volume) identical to that applied on the vapor-deposited metal, and then measuring the thickness by optical interferometer techniques. Since these thickness measurements necessarily are estimates based upon the most convenient and reasonably reliable techniques for fine-thickness measuring known, the specific numerical values discussed herein and recited in the claims are to be considered orders of magnitude, and not exact values. It is critical, however, that the resin topcoat film is so thin as to be far less than the wave length of heat radiation. Thus, I consider that the maximum thickness for this film should not exceed about one-fourth the wave length of the shortest wave lengths (e.g., as low as about 0.76 micron) of infra-red heat energy. Gaining such extraordinarily thin coatings of resin presents another problem to which this invention presents an economical and practical manufacturing solution.

Application of the topcoat is conveniently accomplished by using a rotogravure coating roll and a highly dilute solution (e.g., up to about 10% solids by weight, preferably no more than about 3% solids) of the organic resin to be applied. The solvent employed for dilution is preferably selected amongst those known to be ineffective to dissolve the material of the base film under the conditions of applying the topcoat. Referring to FIGURE 2, a roll 20 dipping into a dilute solution 21 of the film-forming resin in pan 22 transfers that resin onto rotogravure roll 23. An illustrative dilute coating solution is one contining methylene bis(4-phenol isocyanate) at about 2% solids in a solvent mixture of monochlorobenzene and methyl isobutyl ketone. The resin coating solution passes into recesses of the rotogravure roll and excess solution is wiped from the rotogravure roll by a doctor blade 24 prior to the time the solution is transferred from the rotogravure roll onto the surface of the metal coated base sheet 25. The metal coated base sheet 25 is disposed with its metal coating adjacent the rotogravure roll 23 and pressed against the rotogravure roll by guide roll 26. This procedure avoids scraping or scratching of the metal coating, which is a problem if knife coating techniques are employed. The solution is deposited in an essentially discontinuous repetitive pattern of closely adjacent elements. Once transferred upon the metal coating of the base sheet, the closely adjacent deposits of the extremely dilute or fluid solution tend to flow together essentially immediately and form themselves into a substantially uniform and continuous ultra thin coating over the metal layer, following which solvent from this coating is rapidly removed by any suitable technique such as exposure of the laminate to heat lamps 27. Then the laminate is wound up in a roll 28 and later cut to size for use.

As a specific illustration of a laminate hereof and a preferred method of manufacture, a 7.5 mil thick sheet of biaxially-oriented transparent polyethyleneterephthalate ("Mylar") was coated with a layer of gold by vapor deposition until light transmission through the coating was limited to about 20–22% of the original intensity of visible light at about 5500 angstrom units (i.e., a coating thickness of approximately 400–600 angstrom units), following which a film of resin at about 700 angstrom units thick was formed over the vapor-deposited gold. The resin selected was a copolyester of terephthalic acid and isophthalic acid (about equal parts each) with ethylene glycol. Although a super polymer, this resin is soluble in cyclohexanone at low solids concentration as used herein. It was applied from solution in cyclohexanone at a solids concentration of 1.4% by weight, using a rotogravure roll applicator having V-shaped diagonal recesses therein (No. 180 Ruling Mill rotogravure roll of the International Engraving Corporation) capable of transferring an average of about 7 cubic centimeters of coating solution over each square meter of the substrate to be coated.

Following application of the dilute resin coating, deposits of it flowed together; and then the cyclohexanone solvent was removed by passing the structure underneath heat lamps for a total time of exposure of about 2 or 3 minutes, which was sufficient to effect substantially complete removal of solvent and some heat treatment of the coating.

A surprising feature of the foregoing structure is that its transmission of light within the visible range, specifically at 5500 angstrom units, was improved something like about 3 to 5% over the transmission of light at this wave length immediately prior to application of the ultra thin topcoating. Further, any decrease of infra-red reflectivity of the composite laminate over the infra-red reflectivity for the structure prior to application of the topcoating was only on the order of approximately 1% or so. In other words, the decrease in infra-red reflectivity caused by the ultra thin topcoat was negligible.

Significantly, the transmission of infra-red through the structure is not an exact corollary of the amount that is reflected by the article. For example, while approximately 80–85% of wave lengths at 0.8 micron incident upon the front face of the structure are reflected, only something less than about 5% of these wave lengths and longer ones are transmitted through the structure; and while over 90% of infra-red wave lengths at 2 microns are reflected, only something less than 2% at this wave length are transmitted. (The curves of transmission and reflectance in FIGURE 3 are characteristic for the laminate of this specific example. Note that infra-red reflectance on the curve exceeded the measurement of original intensity for these wave lengths as determined by using a Beckman Spectrophotometer with magnesium oxide, which is considered the most reliable technique known.) It appears that some slight absorption of infra-red wave lengths by the mass of the article may occur, with no more than about 5% being transmitted, and usually less. Nevertheless, the amount of heat energy so absorbed has been noted to be insufficient to effect degradation of the article at exposures on the order of 5 minutes or so to a source of intense infra-red heat within an elliptical reflector at an optical temperature of about 2000° F., with the reflective surface of the article at about 3 inches from the source and located in the external focal line of the reflector.

The high resistance to abrasive removal of the vapor-deposited metal film of my laminate is particularly significant. Repeated strong brushing of the reflective surface fails to dislodge the metal coating, whereas a single brush stroke over a vapor-deposited gold coating on a polyethylene terephthalate base sheet without the ultra thin topcoat hereof serves to remove gold. In view of this phenomenon, one might be led to conjecture that the resin topcoat hereof serves in the nature of a binder to penetrate through the thin gold coating of my article to anchor itself, as well as the gold, to the base sheet. But such explanation, despite its singular attractiveness, seems utterly refuted as a complete explanation by a simple test involving the use of normally tacky and pressure-sensitive adhesive cellophane tape (e.g., "Scotch" brand pressure-sensitive cellophane tape). When an end of a strip of such tape is pressed into adherent contact over the ultra thin resin coating of the foregoing specific example, and then removed by peeling it off with a lifting action, there is no noticeable or significant removal of the vapor-deposited gold film. Similarly, there is no noticeable or significant removal of the vapor-deposited coating of gold if this tape test if conducted directly upon the thin vapor-deposited gold coating prior to applying the ultra thin topcoat of resin (which is rather surprising in view of easy removal of the gold by mere brushing contact). But when this tape test is conducted on a structure formed in all respects identical to the foregoing specific example, except that its topcoat of resin is on the order of about 0.3 micron thick, removal of patches of the vapor-deposited gold film with the tape has been noted to occur on lifting the tape. These tests suggest that the ultra thin topcoating of resin does not behave alone as a binder for discrete particles of vapor-deposited metal, and that penetration of it through cracks or slight spaces between particles of metal in the metal film, where such penetration occurs, appears to be only incidental and not alone as such the primary critical requirement of my structure.

The invention, while described with particular reference to the art of providing heat-protective face shields, may be useful in a wide variety of other fields where ultra thin coatings of resin materials are needed. The structure may be useful in electrical applications, as a replacement for metal leaves, etc. Where visibility characteristics may be sacrificed, the laminate may be formed of opaque base sheets with opaque or thicker vapor-deposited coatings and ultra thin protective resin layers thereover. At the thicknesses employed wave length degradation seems to be obviated. Also, the method of applying ultra thin resin coating as described herein may itself be useful in other arts than the heat-reflective art, whether the base to be coated is rigid or flexible. Mainly, however, the invention provides flexible durable abrasion-resistant long-wearing face shields for the protection of individuals against heat-exposure, and thus offers the art a convenient and efficient solution to this problem.

The foregoing is to be construed as illustrative of my invention, which is further set forth and defined in the claims.

That which is claimed is:

1. A face shield transmissive of at least a portion of visible wave lengths of light and highly reflective of infra-red wave lengths, comprising a base sheet substantially transparent to light in the visible range, a vapor-deposited visibly-transparent visibly-continuous highly infra-red-reflective metal coating on said base sheet, and an ultra thin continuous transparent film of resin over said vapor-deposited metal coating, said resin film being no greater than about 0.15 micron thick.

2. A face shield adapted to transmit at least 5% of the original intensity of at least one wave length of visible light incident upon its front face, reflective of at least 60% of the original intensity of infra-red wave lengths from about 0.8 up to about 2 microns incident upon its front face, and reflective of at least 75% of the original intensity of infra-red wave lengths above about 2 microns incident upon its front face, comprising a base sheet substantially transparent to light in the visible range, a vapor-deposited visibly-transparent visibly-continuous highly infra-red-reflective metal coating on said base sheet, said metal coating being between about 100 and 2000 angstrom units thick, and an ultra thin continuous transparent film of resin over said metal coating, said resin film being no greater than about 0.15 micron thick and serving to protect said metal coating against abrasive removal without substantially decreasing the infra-red-reflective properties thereof.

3. A laminate comprising a base sheet, a vapor-deposited metal coating on said base sheet, and an ultra thin continuous transparent film of resin over said vapor-deposited coating, said resin film being no greater than about 0.15 micron thick.

4. The method of forming an ultra thin continuous transparent organic coating up to about 0.15 micron thick over a vapor-deposited visibly-continuous metal coating on a solid substrate comprising depositing a substantially discontinuous layer of transparent film-forming organic material, dissolved in a solvent in which it is soluble, in the form of a repetitive pattern of elements upon said vapor-deposited metal coating, the solution of said organic material being so fluid and the deposited elements so concentrated in each unit of area upon said vapor-deposited metal coating that an essentially continuous layer develops essentially immediately after deposition as a result of flowing together of deposited elements, said continuous layer so formed being so thin that evaporation of solvent therefrom leaves a coating of said organic material no greater than 0.15 micron thick, and then evaporating solvent from the layer.

5. The method of forming a heat-reflective laminate having an ultra thin transparent organic coating comprising vapor depositing metal as a visibly-continuous layer upon a substrate, depositing a transparent organic film-forming material, dissolved in a solvent in which it is soluble, as a substantially discontinuous layer having a repetitive pattern of elements over said vapor-deposited metal layer, said deposited elements being so concentrated and the solution so fluid that the elements essentially immediately flow together to form a continuous layer having a thickness no greater than 0.15 micron after evaporation of solvent therefrom, and then evaporating solvent from the layer.

6. The method of forming an ultra thin continuous transparent organic coating over a solid subtrate comprising rotogravure coating a transparent organic film-forming material, dissolved in a solvent in which it is soluble, as a discontinous layer having a repetitive pattern of elements, the coated material being so fluid and the elements of the pattern so concentrated that the elements essentially immediately flow together to form a continuous layer having a thickness no greater than 0.15 micron after evaporation of solvent therefrom, and then evaporating solvent from the layer.

7. A face shield transmissive of at least 5% of the original intensity of at least one wave length of visible light incident upon its front face and reflective of at least about 85% of the original intensity of infra-red wave lengths above about 0.8 micron incident upon its front face, said shield comprising a flexible substantially light-transmissive film of polyethylene terephthalate between about 2 and 10 mils thick, a vapor-deposited visibly-transparent visibly-continuous highly infra-red-reflective gold coating on said polyethylene terephthalate film, said gold coating being between about 100 and 2,000 angstrom units thick, and an ultra thin continuous transparent film of resin over said gold coating, said resin film being no greater than about 0.15 micron thick and serving to protect said gold coating against abrasive removal without substantially decreasing the infra-red-reflective properties thereof.

References Cited in the file of this patent

UNITED STATES PATENTS

| 2,671,734 | Rosenblum | Mar. 9, 1954 |
| 2,703,772 | Keithly | Mar. 8, 1955 |
| 2,893,900 | Machlin | July 7, 1959 |
| 2,923,640 | Buckingham | Feb. 2, 1960 |
| 2,937,955 | Loomer | May 24, 1960 |

FOREIGN PATENTS

| 204,418 | Australia | Nov. 23, 1956 |
| 1,060,751 | Germany | July 2, 1959 |